US011511663B1

(12) United States Patent
Leung et al.

(10) Patent No.: US 11,511,663 B1
(45) Date of Patent: Nov. 29, 2022

(54) SYSTEMS AND METHODS FOR DISPLAYING CONTEXTUALLY-SENSITIVE BRAKING INFORMATION

(71) Applicant: BlueOwl, LLC, San Francisco, CA (US)

(72) Inventors: Theobolt N. Leung, San Francisco, CA (US); Tina Fang, San Jose, CA (US); Kenneth Jason Sanchez, San Francisco, CA (US)

(73) Assignee: BlueOwl, LLC, San Francisco, CA (US)

( * ) Notice: Subject to any disclaimer, the term of this patent is extended or adjusted under 35 U.S.C. 154(b) by 231 days.

(21) Appl. No.: 16/808,846

(22) Filed: Mar. 4, 2020

(51) Int. Cl.
*B60Q 1/44* (2006.01)
*B60T 17/22* (2006.01)
(Continued)

(52) U.S. Cl.
CPC .............. *B60Q 1/444* (2013.01); *B60Q 1/50* (2013.01); *B60T 17/221* (2013.01); *G01L 5/28* (2013.01);
(Continued)

(58) Field of Classification Search
CPC ...... B60Q 1/444; B60Q 1/50; B60Q 2400/00; H04W 4/40; G06V 20/58; G06V 40/172; G06V 30/10; B60T 17/221; B60T 2210/30; B60T 2210/32; G01L 5/28; G01W 1/00; G05B 13/0265; G08G 1/096775
See application file for complete search history.

(56) References Cited

U.S. PATENT DOCUMENTS 6,809,654 B2   10/2004  Hudson
6,812,851 B1   11/2004  Dukach et al.
(Continued)

FOREIGN PATENT DOCUMENTS

CN   2598085 Y   1/2004
CN   101547538 A   9/2009
(Continued)

OTHER PUBLICATIONS

Alburger Matty, "How does mobile billboard advertising work?", Hauler Ads., Retrieved from http://info.haulerads.com/moving-billboard-blog/how-does-mobile-billboard-advertising-work, Apr. 2019, 5 pages.
(Continued)

*Primary Examiner* — Mohamed Barakat
(74) *Attorney, Agent, or Firm* — Faegre Drinker Biddle & Reath LLP (57) ABSTRACT

A system for displaying contextually-sensitive braking information on a surface of a vehicle is presented. The system may include a transceiver, one or more memories, an electronic display disposed on the surface, and one or more processors. The one or more processors may be configured to detect a braking event of the vehicle, wherein the braking event has an associated braking force. The one or more processors may compare the braking force to a predetermined threshold braking force to determine whether the braking force exceeds the threshold braking force. The one or more processors may further cause the electronic display to display a braking indication having an intensity that is proportional to the braking force, wherein the braking indication may include a braking rationale corresponding to the braking event in response to determining that the braking force exceeds the threshold braking force.

17 Claims, 4 Drawing Sheets

(51) Int. Cl.
| | |
|---|---|
| *B60Q 1/50* | (2006.01) |
| *G01L 5/28* | (2006.01) |
| *G01W 1/00* | (2006.01) |
| *G05B 13/02* | (2006.01) |
| *H04W 4/40* | (2018.01) |
| *G08G 1/0967* | (2006.01) |
| *G06V 20/58* | (2022.01) |
| *G06V 40/16* | (2022.01) |
| *G06V 30/10* | (2022.01) |

(52) U.S. Cl.
CPC ........... *G01W 1/00* (2013.01); *G05B 13/0265* (2013.01); *G06V 20/58* (2022.01); *G06V 40/172* (2022.01); *G08G 1/096775* (2013.01); *H04W 4/40* (2018.02); *B60Q 2400/00* (2013.01); *B60T 2210/30* (2013.01); *B60T 2210/32* (2013.01); *G06V 30/10* (2022.01)

(56) References Cited

U.S. PATENT DOCUMENTS

| | | | |
|---|---|---|---|
| 7,095,318 | B1 | 8/2006 | Bekhor |
| 9,262,775 | B2 | 2/2016 | Lamont |
| 9,702,706 | B2 | 7/2017 | Liu et al. |
| 9,855,889 | B1* | 1/2018 | Mullis .................... B60Q 1/444 |
| 10,475,127 | B1 | 11/2019 | Potter et al. |
| 10,616,125 | B1 | 4/2020 | Shi et al. |
| 10,665,155 | B1 | 5/2020 | Rao |
| 10,817,949 | B1 | 10/2020 | Wieduwilt et al. |
| 2002/0112026 | A1 | 8/2002 | Fridman et al. |
| 2010/0036717 | A1 | 2/2010 | Trest |
| 2013/0138508 | A1 | 5/2013 | Gee |
| 2013/0173358 | A1 | 7/2013 | Pinkus |
| 2014/0052537 | A1 | 2/2014 | Garnet et al. |
| 2014/0218190 | A1 | 8/2014 | Prenger |
| 2015/0025975 | A1 | 1/2015 | Wallach |
| 2015/0170522 | A1 | 6/2015 | Noh |
| 2015/0194082 | A1* | 7/2015 | McEwan ................ B60Q 1/444 40/591 |
| 2015/0375748 | A1 | 12/2015 | Nagase et al. |
| 2016/0098756 | A1 | 4/2016 | Ayre |
| 2016/0250966 | A1 | 9/2016 | Giguere |
| 2017/0028906 | A1 | 2/2017 | Beach |
| 2017/0190283 | A1* | 7/2017 | Ding ....................... B60T 17/22 |
| 2017/0287076 | A1 | 10/2017 | Bowne et al. |
| 2017/0291591 | A1* | 10/2017 | Steer ..................... B60T 17/221 |
| 2018/0335781 | A1 | 11/2018 | Chase et al. |
| 2019/0126892 | A1* | 5/2019 | Lee ....................... B60W 30/09 |
| 2019/0138988 | A1 | 5/2019 | High et al. |
| 2019/0213931 | A1 | 7/2019 | Brubaker |
| 2019/0347582 | A1 | 11/2019 | Allen et al. |
| 2020/0090562 | A1 | 3/2020 | Delorean |
| 2020/0156536 | A1* | 5/2020 | Lee .......................... B60Q 1/28 |
| 2020/0184862 | A1 | 6/2020 | Kim et al. |
| 2021/0174687 | A1* | 6/2021 | Sasmal ................ G05D 1/0295 |

FOREIGN PATENT DOCUMENTS

| | | |
|---|---|---|
| CN | 104050777 A | 9/2014 |
| CN | 207790470 U | 8/2018 |
| DE | 4319833 A1 | 12/1994 |
| GB | 2407198 A | 4/2005 |
| KR | 10-2017-0097284 A | 8/2017 |
| WO | 2008/037899 A2 | 4/2008 |
| WO | 2019/109062 A1 | 6/2019 |

OTHER PUBLICATIONS

Geel et al., "PresiShare: Opportunistic sharing and presentation of content using public displays and QR codes", Proceedings of the 2nd ACM International Symposium on Pervasive Displays, 2013, 6 pages.

Primozic, Ursa, "Real-time truck displays provide location triggered ads, traffic information and more", Visionect, Retrieved from: https://www.visionect.com/blog/electronic-paper-truck-displays, 2016, 7 pages.

Tchir, Jason, "Why don't we have graduated brake lights?", Driving Concerns, The Globe and Mail, Retrieved from https://www.theglobeandmail.com/globe-drive/culture/commuting/why-dont-we-have-graduated-brake-lights/article4460974/, Apr. 2018, 2 pages.

\* cited by examiner

SYSTEMS AND METHODS FOR DISPLAYING CONTEXTUALLY-SENSITIVE BRAKING INFORMATION

FIELD OF THE DISCLOSURE

The present disclosure generally relates to displaying braking information on a vehicle exterior, more particularly, to a system and method for displaying contextually-sensitive braking information on a vehicle exterior including a variable intensity indication and braking rationales.

BACKGROUND

Significant investments of time and money have been placed into developing methods to effectively and safely deliver information to motorists on active roadways. One outcome of those investments is the realization that generally informing motorists of impending roadway conditions before they encounter them can help alleviate those conditions. Moreover, such information may reduce stress and instances of road rage among the driving population, resulting in fewer stress-induced accidents. Traditionally, however, motorists are left relatively unaware of roadway conditions until they encounter them. Conventional mediums to communicate these roadway conditions include the vehicle's integrated radio or digital billboard displays.

However, both methods suffer from drawbacks. First, conventional mediums suffer from a lack of relevant information to accommodate those receiving the message. Second, conventional mediums do not effectively communicate the upcoming roadway information to drivers. For example, the traffic information may not be timely due to radio broadcast schedules and limited physical locations of digital billboards.

SUMMARY

In one embodiment, a system for displaying contextually-sensitive braking information on a surface of a vehicle may be provided. The system may comprise a transceiver; one or more memories; an electronic display disposed on the surface; and one or more processors interfacing with the transceiver, the one or more memories, and the electronic display. The one or more processors may be configured to: detect a braking event of the vehicle, the braking event associated with a braking force; compare the braking force to a predetermined threshold braking force to determine whether the braking force exceeds the threshold braking force; and cause the electronic display to display a braking indication having an intensity that is proportional to the braking force, wherein the braking indication includes a braking rationale corresponding to the braking event in response to determining the braking force exceeds the threshold braking force.

In another embodiment, a computer-implemented method for displaying contextually-sensitive braking information on a surface of a vehicle may be provided. The method may comprise: detecting, by one or more processors, a braking event of the vehicle, the braking event associated with a braking force; comparing, by the one or more processors, the braking force to a predetermined threshold braking force to determine whether the braking force exceeds the threshold braking force; and displaying, by an electronic display disposed on the surface, a braking indication having an intensity that is proportional to the braking force, wherein the braking indication includes a braking rationale corresponding to the braking event in response to determining the braking force exceeds the threshold braking force.

In yet another embodiment, a computer readable storage medium comprising non-transitory computer readable instructions stored thereon for displaying contextually-sensitive braking information on a surface of a vehicle may be provided. The instructions, when executed on one or more processors, may cause the one or more processors to: detect a braking event of the vehicle, the braking event associated with a braking force, compare the braking force to a predetermined threshold braking force to determine whether the braking force exceeds the threshold braking force, and cause the electronic display to display a braking indication having an intensity that is proportional to the braking force, wherein the braking indication includes a braking rationale corresponding to the braking event in response to determining the braking force exceeds the threshold braking force.

Depending upon embodiment, one or more benefits may be achieved. These benefits and various additional objects, features and advantages of the present invention can be fully appreciated with reference to the detailed description and accompanying drawings that follow.

The figures depict various aspects of the present disclosure for purposes of illustration only. One skilled in the art will readily recognize from the following discussion that alternative embodiments of the structures and methods illustrated herein may be employed without departing from the principles of the disclosure.

DETAILED DESCRIPTION

Figure 1:
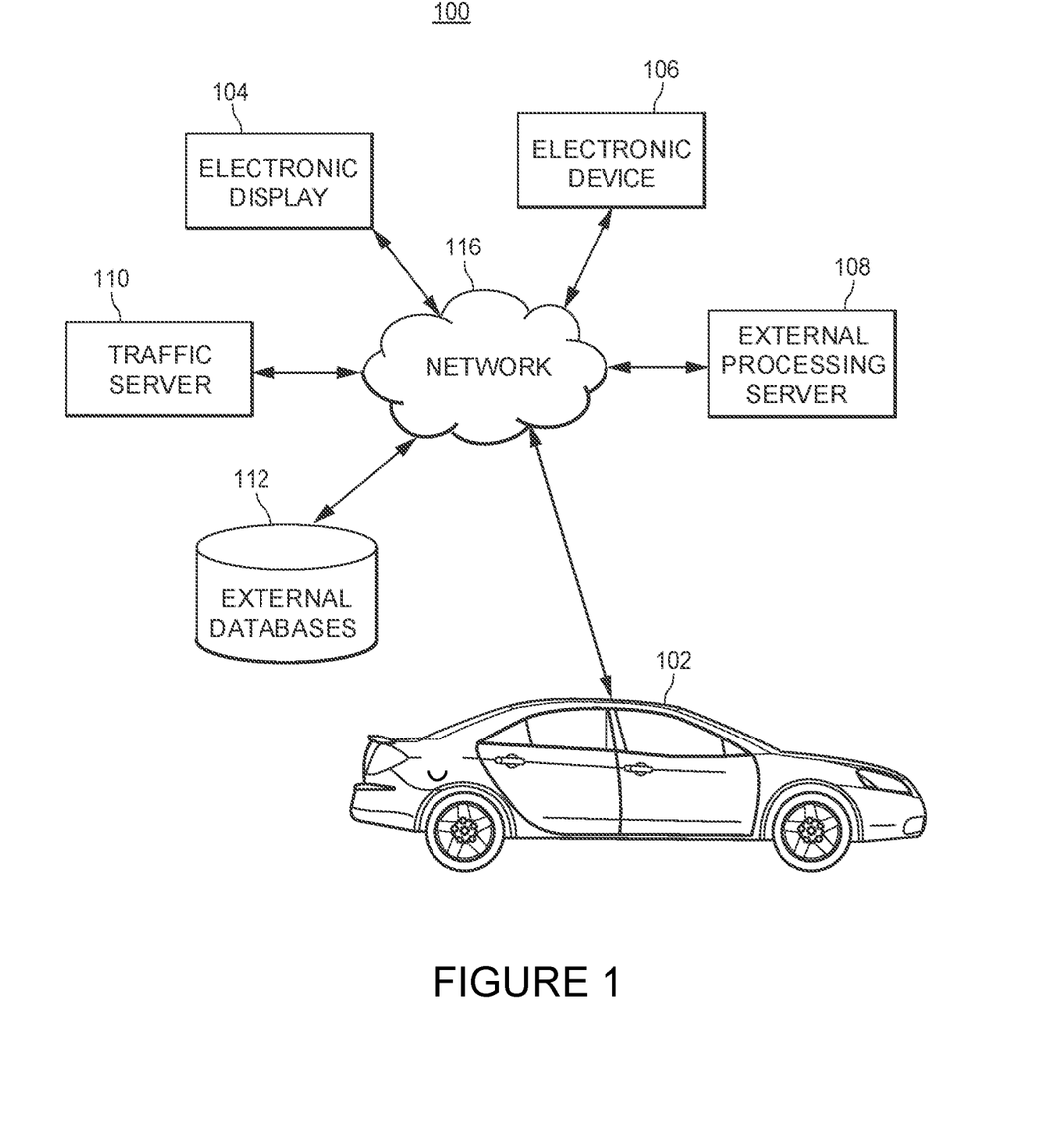
FIG. 1 illustrates an example system for displaying contextually-sensitive braking information on a surface of a vehicle.

I. Examples of Systems and Related Functionality for Displaying Contextually-Sensitive Braking Information FIG. 1 illustrates an example system 100 for displaying contextually-sensitive braking information (also referenced herein as a "braking indication"). The example system 100 may include a vehicle 102, an electronic display 104, an electronic device 106, an external processing server 108, a traffic server 110, external databases 112, and a network 114. While illustrated in FIG. 1 as a single external database, in some embodiments the external databases 112 include two or more external databases. The network 114 may be a computer network of an insurance provider (e.g., provided or used by the insurance provider or communications over which the insurance provider otherwise controls or facilitates). Generally speaking, all components of the system 100 may be connected to one another via the network 114, such that the network 114 may facilitate communications between and among the various system 100 components (e.g., electronic display 104, electronic device 106, etc.).

Figure 2:
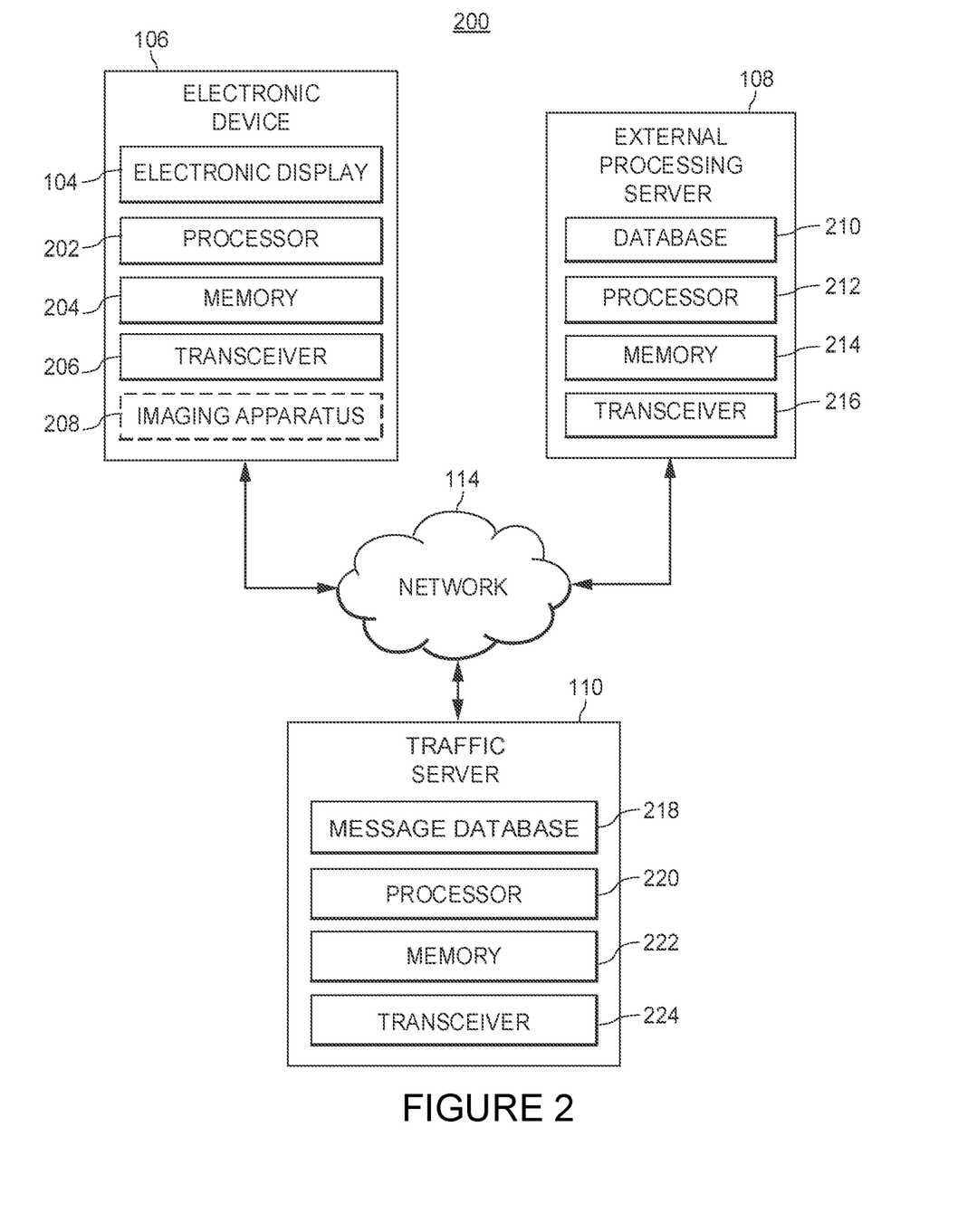
FIG. 2 illustrates another example system for displaying contextually-sensitive braking information on a surface of a vehicle.

FIG. 2 illustrates another example system for displaying contextually-sensitive braking information on a surface of a vehicle. In reference to the example system 200 of FIG. 2, the electronic device 106 may include the electronic display 104, a processor 202, a memory 204, a transceiver 206, and an optional imaging apparatus 208. While referred to herein as a "processor" and a "memory," in some embodiments the processor 202 includes two or more processors and the memory 204 includes two or more memories. The processor 202 may be configured to analyze both still image data and video data (e.g., video data received by the transceiver 206) and analyze aspects of the still image data and/or video data.

The memory 204 may store computer-executable instructions, which may be executed by the processor 202. Additionally, the memory 204 may store a plurality of braking displays. For example, the plurality of braking displays may represent a plurality of messages that may be displayed on the electronic display 104 in response to a braking event. As discussed further herein, the electronic device 106 may detect a braking event, and cause the electronic display 104 (e.g., via the processor 202) to display a braking indication. As part of the braking indication, the electronic device 106 may retrieve a braking rationale from the memory 204, and display the braking rationale on the electronic display 104.

As discussed further herein, the braking rationale may indicate a reason or other explanation related to the braking event. For example, if the driver of a vehicle (e.g., vehicle 102) encounters a situation while driving in which they need to stop quickly, the driver may apply a large amount of force to the brake pedal in an attempt to quickly stop the vehicle. However, the situation encountered by the driver of the vehicle may not be readily apparent to drivers traveling behind the driver's vehicle ("following drivers"), and thus may cause confusion and stress among the following drivers. The braking rationale may provide an explanation to the following drivers in order to eliminate the confusion and alleviate any stress associated with the braking event.

It should be understood that the electronic display 104 may be either an external, standalone device or an internal component of the electronic device 106. In other words, in embodiments, the electronic display 104 may be a standalone entity affixed to a surface of a vehicle (e.g., vehicle 102). For example, the electronic display 104 may be an integrated component of the existing brake lights of a vehicle. In that case, the electronic display 104 may have a processor, memory, imaging apparatus, transceiver, etc. and be configured to receive a braking indication from the electronic device 106, external processing server 108, traffic server 110, or any other suitable transmitter (e.g., external databases 112). Accordingly, the electronic display 104 may be any suitable electronic display, may include any suitable display components, and may be of any suitable dimension. For example, the electronic display 106 may be a light-emitting diode (LED) display, an electroluminescent (ELD) display, an electronic paper display, a plasma display panel (PDP), a liquid crystal display (LCD), an organic LED (OLED) display, a quantum dot (QLED) display, a segment display, a cathode ray tube (CRT) display, a surface-conduction electron-emitter display (SED), an interferometric modulator display (IMOD), a digital microshutter (DMS) display, a field emission display (FED), and/or any other suitable display or combination thereof.

Moreover, the memory 204 may store other relevant data corresponding to the systems and methods of the present disclosure. For example, the memory 204 may store a predetermined threshold braking force. The threshold braking force may correspond to an applied braking force, beyond which, the electronic device 106 may determine a braking indication for display on the electronic display 104. The memory 204 may also store a maximum braking force. The maximum braking force may indicate the maximum possible braking force that can be applied for the particular vehicle (e.g., vehicle 102). Using the maximum braking force, the electronic device 106 may determine a degree of braking force applied during any braking event.

More specifically, the electronic device 106 may correspond with the internal systems of the vehicle 102 (e.g., the electronic control unit (ECU)) to retrieve accurate braking measurements for any braking event. The electronic device 106 may then compare the braking measurements to the maximum braking force to determine the degree of braking force applied in a braking event. The electronic device 106 may translate this degree of braking force into an intensity of a braking display (e.g., electronic display 104, vehicle's 102 integrated brake lights). For example, the electronic device 106 may retrieve (e.g., from memory 204) a maximum intensity for the electronic display 104. The electronic device 106 may then signal the electronic display 104 to illuminate at an intensity proportional to the degree of braking force.

To illustrate, assume a driver brakes in response to approaching a stop light. The driver may not apply maximum braking force in this circumstance, but instead may apply only 40% of the maximum possible braking force in order to bring the vehicle (e.g., vehicle 102) to a stop. Thus, the electronic device 106 may either directly sense/detect the 40% applied braking force, or may communicate with the vehicle's 102 internal systems (e.g., ECU) to retrieve the 40% applied braking force. In any event, the electronic device 106 may translate the 405 applied braking force to a corresponding intensity by calculating 40% of the maximum intensity of the electronic display 104. The device 106 may then transmit a signal to the electronic display 104 indicating that the display 104 should illuminate to 40% of the maximum intensity. It is to be understood that, in embodiments where the electronic display 104 is a standalone device, the electronic display 104 may independently perform the various actions described in this example.

In this manner, the systems and methods of the present disclosure provide accurate and insightful braking information to proximate drivers. Varying intensity braking displays in response to variable applied braking force provides an easily recognizable and quickly understandable indication of the severity of any braking event. Thus, the systems and methods of the present disclosure may help reduce rear end collisions by quickly and efficiently informing proximate drivers of the applied braking force during a braking event to enable the proximate drivers to better judge how forcefully to apply the brakes themselves.

The optional imaging apparatus 208 may include, for example, an imaging system (e.g., a camera, a video camera), and/or a proximity sensor. As such, the optional imaging apparatus 208 may be configured to capture still images, video footage, and/or proximity information (e.g., indicative of distances to/from the imaging apparatus) or a combination thereof. However, it should be understood that the optional imaging apparatus 208 is not limited to the sensors disclosed herein. Additionally, the electronic device 106 may be configured to receive communications from the external processing server 108, the traffic server 110, and/or other suitable transmitters (e.g., external databases 112) of combinations thereof in response to transmitting captured data and/or before, during, or after displaying a braking indication.

The external processing server 108 may include a database 210, a processor 212, a memory 214, and a transceiver 216. While referred to herein as a "processor" and a "memory," in some embodiments the processor 212 includes two or more processors and the memory 214 includes two or more memories. The processor 212 may be configured to process both still image data and video data (e.g., video data received from the electronic device 106) and analyze aspects of the still image data and/or video data. The memory 214 may store computer-executable instructions, which may be executed by the processor 212. The database 210 may include a plurality of braking displays.

For example, the plurality of braking displays may represent a plurality of messages that may be displayed on the electronic display 104 in response to a braking event. As discussed further herein, the electronic device 106 may detect a braking event, and cause the electronic display 104 (e.g., via the processor 202) to display a braking indication. As part of the braking indication, the electronic device 106 may request a braking rationale from the external processing server 108. Accordingly, the server 108 may access the database 210, retrieve a braking rationale from the database 210, and transmit the braking rationale to the electronic device 106 via transceiver 216 for display on the electronic display 104.

Generally speaking, the braking rationale retrieved form the database 210 may include any suitable message for display on the electronic display 104. More specifically, the braking rationale may include any combination of alphanumeric characters, symbols, images, video images, audio bytes, and/or any other audio/visual representations or combinations thereof. For example, a braking rationale may include a message stating "Traffic ahead," "Animal crossing," "Traffic accident," or any other suitable message.

The system 200 further includes the traffic server 110. The traffic server 110 includes a message database 218, a processor 220, a memory 222, and a transceiver 224. While referred to herein as a "processor" and a "memory," in some embodiments the processor 220 includes two or more processors and the memory 222 includes two or more memories. The message database 218 may include a set of braking indications for display, for example, on the electronic display 104 disposed on a surface of the vehicle 102.

The traffic server 110 may be connected to each of the electronic device 106 and the external processing server 108 via the network 114, such that all devices (106, 108, and 110) may communicate to each other via their respective transceivers (206, 216, and 224). For example, the external processing server 108 may receive image/video data from the electronic device 106. The external processing server 108 may store this received data in its database 210 and/or its memory 214. Thus, and as discussed further herein, the external processing server 108 may be configured to process, analyze, or otherwise interpret data captured by and/or received from the electronic device 106. Moreover, the traffic server 110 may transmit braking indications to the electronic device 106 and/or external processing server 108 through the network. The device 106 and/or server 108 may receive the braking indications and store them in memory 204, 214 and/or further transmit the braking indications to the electronic device 106 and/or electronic display 104 for display. It will be appreciated that the external processing server 108 and/or traffic server 110 may be a server and/or device provided by or used by an insurance provider, or use of which the insurance provider otherwise controls or facilitates.

Further the traffic server 110 may receive traffic updates for transmittal to either or both of the electronic device 106 and the external processing server 108. For example, the traffic server 110 may communicate with vehicles caught in traffic conditions, infrastructure components configured to monitor and provide traffic updates (e.g., traffic cameras), external databases configured to track and/or produce traffic updates (e.g., external databases 112), and/or any other suitable resource or combination thereof. To illustrate, the traffic server 110 may communicate with a vehicle in a traffic condition via vehicle-to-infrastructure (V2I) communication protocols. The vehicle may indicate its position on a major highway and that its current speed is 0 miles per hour (MPH). The data received from the vehicle may comprise a traffic data set. Correspondingly, the traffic server 110 may transmit a signal to the external processing server 108 including the traffic data set. As further discussed herein, the external processing server 108 may analyze the traffic data set to determine a braking indication associated with the future traffic. It is to be appreciated that the traffic server 110 may receive traffic information to be analyzed by an external server (e.g., external processing server 108) or the server 110 may receive traffic data, analyze the traffic data to determine a braking indication, and transmit the braking indication to an external device (e.g., electronic device 106) for display.

In embodiments, the network 114 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The network 114 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

As further described below, the example systems (100, 200) facilitate braking indication displays on automobiles, and allow, among other advantages, relevant messages that have a heightened conveyance potential and are specifically crafted to reduce proximate driver confusion and stress. The displays provide a technical improvement over the general messages on conventional display devices and/or radio broadcasts because they are more relevant and effective due to being dynamically updated and targeted for the proximate viewing audience (e.g., proximate motorists). Additionally, placing the displays on proximate vehicles (e.g., electronic display 104 on vehicle 102) presents a technical solution to the technical problem posed by conventional display devices. Namely, the systems and methods of the present disclosure, reduce the distraction potential for other motorists by keeping their focus nearer to their local surroundings (e.g., active roadways, sidewalks, crosswalks, etc.) instead of the elevated positions of conventional display devices that remove their focus from such surroundings. Moreover, by providing these braking indications, the systems and methods of the present disclosure may reduce instances of road rage among the driving population. Thus, the systems and methods of the present disclosure have the additional effect of mitigating future traffic accidents through the benefits associated with minimal driver confusion and stress.

II. Examples of Operational Embodiments of the Systems

Figure 3:
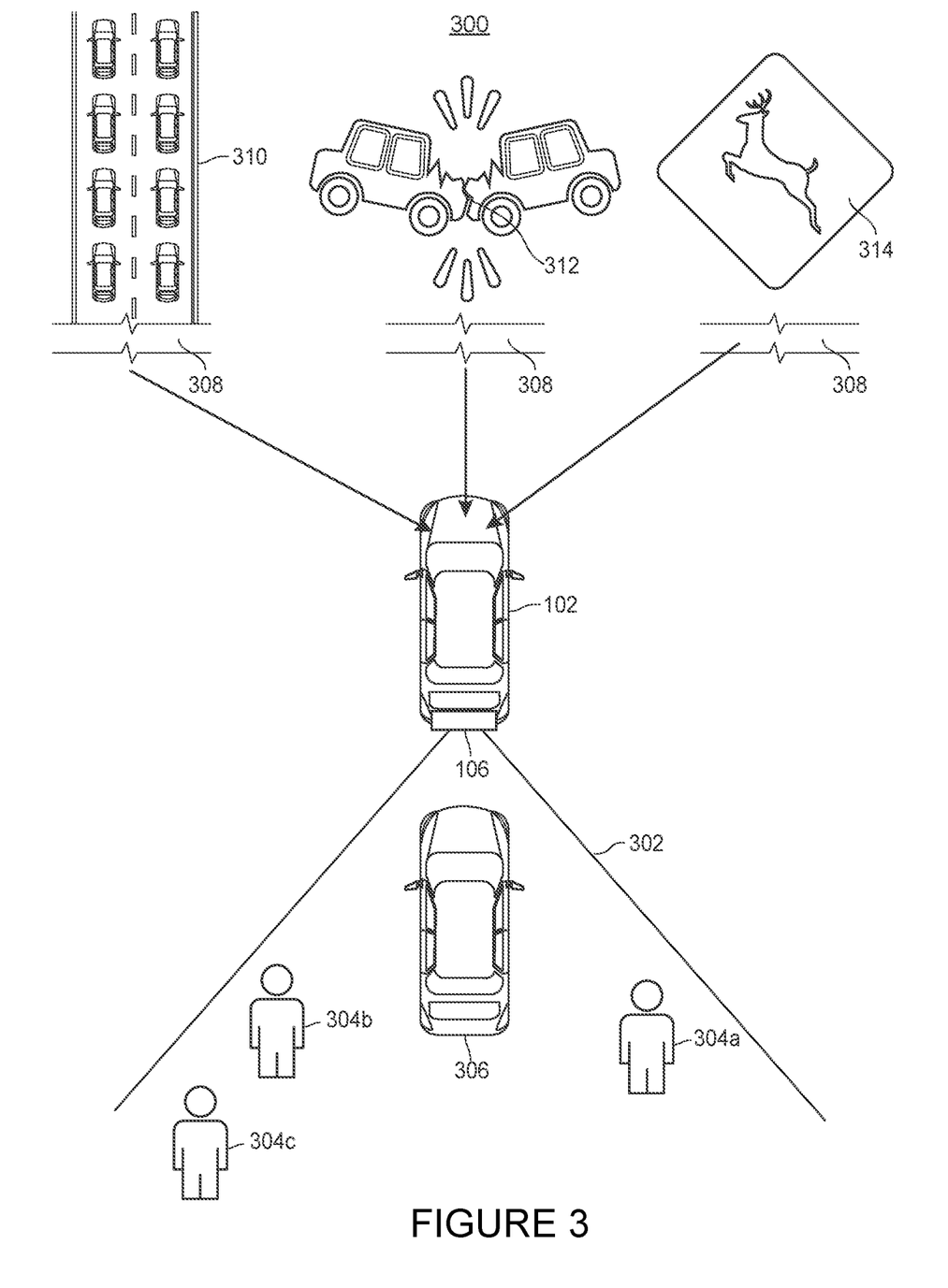
FIG. 3 depicts an operational embodiment of, for example, the system of FIG. 2.

FIG. 3 depicts an operational embodiment 300 of, for example, the system 200. The operational embodiment 300 includes the vehicle 102 and the electronic device 106. The electronic device 106 includes a field of view (FOV) 302 indicating an area where any proximate individuals (e.g., pedestrians 304a-304c) and/or vehicles (e.g., vehicle 306) may view a message displayed on the electronic device 106. In embodiments, and as previously mentioned, the device 106 may include sensors (e.g., optional imaging apparatus 208) capable of capturing data (e.g., data of an upcoming environment of the vehicle). These sensors may surround the vehicle 102 exterior or be placed at various locations around the vehicle 102, and thus may have an effective FOV corresponding to the entire surrounding environment of the vehicle or any portion of the surrounding environment therein. Moreover, and as discussed further herein, the sensors' effective FOV may have a range of any suitable degree to capture any needed data. For example, the device's 106 sensors may be disposed at a plurality of locations around the vehicle 102 such that the entire surrounding environment (e.g., 360° view surrounding the vehicle 102) is captured to yield data. Namely, the sensors' effective FOV may extend radially from the front of the vehicle 102, such that the sensors capture data related to an upcoming environment of the vehicle 102.

The operational embodiment 300 additionally depicts a set of upcoming events (as indicated by 308) that may prompt the electronic device 106 to display a braking indication. For example, the vehicle 102 may rapidly approach a traffic jam 310 that is not readily visible. The vehicle 102 may be traveling on an interstate highway and approach an elevated bridge at high speed. Sitting atop the bridge may be the back end of a traffic jam featuring a plurality of stationary vehicles. Correspondingly, as the vehicle 102 nears the elevated bridge, the driver may recognize that the plurality of stationary vehicles is rapidly approaching and forcefully apply the brakes in an attempt to avoid a collision (e.g., the "braking event," in this scenario). The electronic device 106 may detect the large amount of applied braking force and compare the applied braking force to a braking threshold. Should the electronic device 106 determine that the applied braking force exceeds the threshold braking force, the electronic device 106 may proceed to display a braking indication providing context for the braking event. The electronic device 106 may either generate a braking indication or retrieve a braking indication from an external source (e.g., external processing server 108, traffic server 110).

For example, the electronic device 106 may communicate with the traffic server 110 to retrieve traffic data related to the vehicle's 102 current location. This communication with the traffic server 110 may include location data corresponding to the vehicle 102, such as global positioning service (GPS) data or any other suitable location indication. The traffic server 110 may check all known traffic indications stored in memory 222 and/or actively update the traffic indications in response to receipt of the electronic device's 106 transmission. If any known and/or received traffic indications include or otherwise match the location specified in the device's 106 transmission, the server 110 may determine that the event listed in the indication is responsible for the braking event.

In response, the traffic server 110 may transmit the indication of the traffic jam as received by the server 110, or may generate a braking indication suitable for display on the electronic device 106 (e.g., on the electronic display 104). Additionally, the traffic server 110 may include information detailing the type, magnitude, delay, distance, location, or any other suitable indicator or combination thereof related to the traffic jam 310. Thus, the indication of the traffic jam 310 may indicate that the traffic jam 310 formed approximately 35 minutes ago, extends 1.25 miles, and is causing an average delay of 20 minutes. In any event, and as mentioned previously, the braking indication may include any suitable message, such as "Traffic jam," or "20 minute slowdown."

The operational embodiment 300 additionally features a depiction of a traffic accident 312, which may lead to a sudden braking event. The vehicle 102 may be traveling on a residential roadway when two vehicles in front of the vehicle 102 suddenly collide. Correspondingly, as the vehicle 102 nears the site of the collision, the driver may recognize that the now-stationary collided vehicles are rapidly approaching and forcefully apply the brakes in an attempt to avoid an additional collision (e.g., the "braking event," in this scenario). The electronic device 106 may detect the large amount of applied braking force and compare the applied braking force to a braking threshold. Should the electronic device 106 determine that the applied braking force exceeds the threshold braking force, the electronic device 106 may proceed to display a braking indication providing context for the braking event. The electronic device 106 may either generate a braking indication or retrieve a braking indication from an external source (e.g., external processing server 108, traffic server 110).

For example, the electronic device 106 may communicate with the traffic server 110 to retrieve traffic data related to the vehicle's 102 current location. This communication with the traffic server 110 may include location data corresponding to the vehicle 102, such as global positioning service (GPS) data or any other suitable location indication. The traffic server 110 may check all known traffic indications stored in memory 222 and/or actively update the traffic indications in response to receipt of the electronic device's 106 transmission. If any known and/or received traffic indications include or otherwise match the location specified in the device's 106 transmission, the server 110 may determine that the event listed in the indication is responsible for the braking event. In response, the traffic server 110 may transmit the indication of the traffic jam as received by the server 110, or may generate a braking indication suitable for display on the electronic device 106 (e.g., on the electronic display 104).

Additionally or alternatively, the electronic device 106 may capture data associated with the environment to generate the braking indication. For example, in the traffic accident 312 scenario, the electronic device 106 may capture digital images of the upcoming environment of the vehicle 102 in response to the braking event resulting from the collision. The digital images may indicate two vehicles that each show signs of a collision. Using image analysis techniques, such as object recognition (OR), morphological algorithms, and/or any other suitable methods, the electronic device 106 may determine that an accident has occurred within the upcoming environment of the vehicle 106. Accordingly, the electronic device 106 may generate a braking indication to reflect the collision that resulted in the braking event. For example, the braking indication may include any suitable message, such as "Traffic accident," or "5 minute slowdown."

The operational embodiment 300 additionally features an indication of an animal crossing an active roadway 314, which may lead to a sudden braking event. To illustrate, the vehicle 102 may be traveling on a rural highway at night, and approach a blind corner. Sitting around the blind corner may be an animal, such as a deer. Correspondingly, as the vehicle 102 rounds the blind corner, the driver may recognize that the stationary deer is rapidly approaching and forcefully apply the brakes in an attempt to avoid striking the deer (e.g., the "braking event," in this scenario). The electronic device 106 may detect the large amount of applied braking force and compare the applied braking force to a braking threshold. Should the electronic device 106 determine that the applied braking force exceeds the threshold braking force, the electronic device 106 may proceed to display a braking indication providing context for the braking event. The electronic device 106 may either generate a braking indication or retrieve a braking indication from an external source (e.g., external processing server 108, traffic server 110).

For example, the electronic device 106 may communicate with the traffic server 110 to retrieve traffic data related to the vehicle's 102 current location. This communication with the traffic server 110 may include location data corresponding to the vehicle 102, such as global positioning service (GPS) data or any other suitable location indication. The traffic server 110 may check all known traffic indications stored in memory 222 and/or actively update the traffic indications in response to receipt of the electronic device's 106 transmission. If any known and/or received traffic indications include or otherwise match the location specified in the device's 106 transmission, the server 110 may determine that the event listed in the indication is responsible for the braking event.

Moreover, the traffic server 110 may include a historic traffic indication repository within its memory 222. In the context of the animal crossing 314 scenario, the traffic server 110 may include a profile of the road segment on which the vehicle 102 was traveling (e.g., including the blind corner). Thus, if the traffic server 110 receives a location indication from the electronic device 106 identifying the road segment with the blind corner, and the traffic server does not identify a current traffic indication, the traffic server 110 may check the historic traffic indication repository to determine a potential cause for the braking event due to a known recurring event (e.g., frequent animal crossings). In response, the traffic server 110 may transmit the indication of the traffic jam as received by the server 110, or may generate a braking indication suitable for display on the electronic device 106 (e.g., on the electronic display 104).

Additionally or alternatively, the electronic device 106 may capture data associated with the environment to generate the braking indication. For example, in the animal crossing 314 scenario, the electronic device 106 may capture digital images of the upcoming environment of the vehicle 102 in response to the braking event resulting from the animal crossing. The digital images may indicate a deer standing in the roadway, jumping/running to move out from in front of the approaching vehicle 102, or otherwise present in the digital image. Using image analysis techniques, such as object recognition (OR), morphological algorithms, and/ or any other suitable methods, the electronic device 106 may determine that an animal is located within the upcoming environment of the vehicle 106. Accordingly, the electronic device 106 may generate a braking indication to reflect the animal crossing that resulted in the braking event. For example, the braking indication may include any suitable message, such as "Animal crossing," or "Crossing deer."

Regardless, it is to be understood that in each scenario (e.g., 310, 312, 314) represented in the operational embodiment 300, the electronic device 106 may determine an intensity of the braking display based at least in part upon the applied braking force as compared to the maximum braking force. Correspondingly, the electronic device 106 may cause the electronic display 104 to illuminate at an intensity that is proportional to the ratio of the applied braking force to the maximum braking force.

Further, it is to be understood that, in embodiments, the electronic device 106 may capture image data corresponding to the environment behind the vehicle 102. For example, in any of the scenarios (310, 312, 314) described above, the electronic device 106 may capture image data corresponding to the environment behind the vehicle 102 after detecting the braking event. The electronic device 106 may then perform a similar image analysis as described above, to determine if there are any proximate vehicles (e.g., vehicle 306), pedestrians (e.g., pedestrians 304a-304c), cyclists, and/or any other persons capable of viewing the electronic display 104. If the electronic device 106 determines that there are no proximate persons capable of viewing the electronic display 104, then the electronic device 106 may not cause the electronic display to display a braking rationale (e.g., "Traffic jam," "Crossing deer," etc.). Instead, the electronic device 106 may cause the electronic display 104 to illuminate at an intensity that is proportional to the ratio of the applied braking force to the maximum braking force without additionally displaying the braking rationale.

Moreover, when analyzing the image data corresponding to the environment behind and/or the upcoming environment of the vehicle 102, the electronic device 106 may determine various additional indicators. For example, the additional indicators may include current weather, geographic location, weather forecasts based at least in part upon the location, historical weather patterns, time of day, visibility conditions, proximate roadway congestion (e.g., proximate traffic conditions), historic proximate roadway congestion patterns, proximate roadway congestion forecasts, average daily traffic values, and/or any other suitable indication or combination thereof. The electronic device 106 may determine each of the suitable indications internally, or may transmit all or a portion of the analyzed data to an external server (e.g., external processing server 108, traffic server 110) for additional processing.

Figure 4:
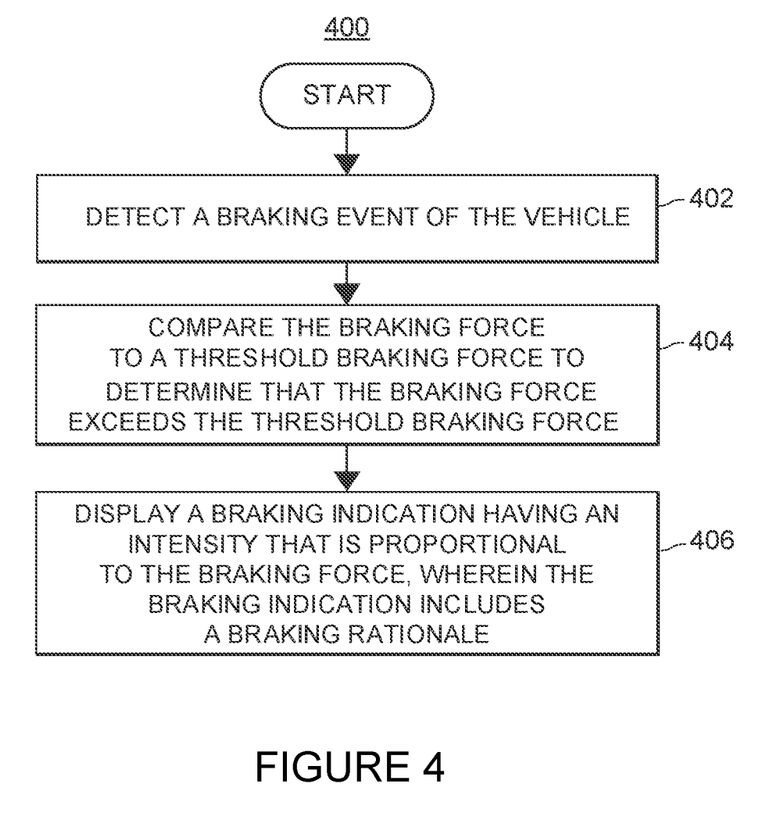
FIG. 4 is a flowchart depicting an example method for displaying contextually-sensitive braking information on a surface of a vehicle, in accordance with embodiments of the present disclosure.

III. Examples of Methods for Displaying Contextually-Sensitive Braking Information FIG. 4 is a flowchart depicting an example method 400 corresponding to various embodiments of the present disclosure. The method 400 begins at block 402 where, for example, a computer processor (e.g., electronic device 106) detects a braking event of a vehicle (e.g., vehicle 102). The braking event may have an associated braking force, which may be measured and/or represented in any suitable units. For example, the computer processor may communicate with the internal sensors of the vehicle (e.g., via the ECU) to determine a braking event. Broadly defined, the braking event may correspond to a compression of the brake pedal located within the interior compartment of the vehicle. This compression of the brake pedal may cause the vehicle to slow down by causing the brake pads to contact the brake rotors that are connected to the rotating axles of the vehicle. It will be appreciated that the mechanical process causing the slowing of the vehicle to occur may be any suitable process. Additionally or alternatively, the computer processor may directly detect the braking event through a suitable connection to the braking system. In either case, the computer processor may receive a measurement of the braking force applied during the braking event. The computer processor may receive a stream of data indicating the braking force applied throughout the braking event, and/or the processor may receive a peak applied breaking force representing the maximum applied braking force at any point during the braking event. Block 402 may be performed by, for example, the electronic device 106.

In embodiments, and as previously mentioned, detecting the braking event may cause the computer processor to additionally capture a set of digital images corresponding to an upcoming environment of the vehicle. The set of digital images may be captured by, for example, an image sensor (e.g., included in the optional imaging apparatus 208). The set of digital images may be included in or otherwise comprise the data associated with the vehicle environment. To illustrate, the driver of a vehicle may initiate a braking event by applying force to the brake pedal of the vehicle. Upon detecting the force applied to the brake pedal (e.g., via attached sensors, integrated sensors, communication with the vehicle ECU, etc.), the image sensor may capture a set of digital images. The set of one or more digital images may feature one or more proximate vehicles (e.g., 306) and/or may feature a proximate object in the upcoming environment of the vehicle.

The set of one or more digital images may be transmitted from the image sensor to a computer processor (e.g., processor 202) for analysis. The computer processor may determine a proximate object within the upcoming environment of the vehicle using one or more of (i) object recognition (OR), (ii) object character recognition (OCR), and/or (iii) facial recognition. For example, the processor may receive the images from the image sensor and begin analysis to identify the proximate object. Using a suitable image analysis technique, the processor may determine that the proximate object is an animal that was positioned in the roadway at the time of the braking event (e.g., animal crossing an active roadway 314). Similarly, the processor may analyze the sets of digital images to determine a proximate object at any point within the proximate environment of the vehicle (e.g., upcoming, behind, side, etc.).

Moreover, in embodiments, the optional imaging apparatus 208 may also include a proximity sensor. The proximity sensor may be configured to capture a set of proximity data. The proximity data may be indicative of a set of distances from a vehicle (e.g., vehicle 102) to a proximate vehicles (e.g., proximate vehicle 306). To illustrate, the driver of a vehicle may initiate a braking event by applying force to the brake pedal of the vehicle. Upon detecting the force applied to the brake pedal (e.g., via attached sensors, integrated sensors, communication with the vehicle ECU, etc.), the proximity sensor may capture a set of proximity data. The proximity data may be indicative of a set of distances from the vehicle for each proximate vehicle. The proximity sensor may, for example, determine that a first proximate vehicle is 10 feet from the rear of the vehicle and that a second proximate vehicle is 6 feet from the passenger's side of the vehicle, etc.

In embodiments, an electronic device (e.g., electronic device 106) may transmit, via a transceiver (e.g., transceiver 206), the set of distances and the set of digital images to an external processing server (e.g., external processing server 108). As discussed further herein, the external processing server may then determine whether a proximate vehicle is within viewing range of the electronic display by correlating the set of distances with the set of digital images. For example, the external processing server may analyze the set of digital images in conjunction with the set of distances to determine that the proximate vehicle is not within a suitable viewing range to the vehicle, and thus, the electronic device. Accordingly, the external processing server may determine that the occupant of the proximate vehicle would be unable to view any braking rationale provided as part of the braking indication. Thus, the external processing server may determine that no braking rationale should be displayed on the electronic display. Instead, the external processing server may determine that the braking indication should have an intensity that is proportional to the braking force applied during the braking event. It is to be appreciated that any analysis, determinations, and/or other procedures related to captured image data, proximity data, and/or any other suitable data may be performed by the electronic device 106.

In embodiments, a computer processor may receive data associated with an environment of a vehicle (e.g., vehicle 102) from one or more of (i) vehicle-to-vehicle (V2V) communication protocols, (ii) vehicle-to-infrastructure (V2I) communication protocols, or (iii) one or more mobile devices. For example, the computer processor may communicate, via a transceiver, with a proximate vehicle (e.g., proximate vehicle 306) to determine all or a portion of the data associated with the vehicle environment. As discussed further herein, the data associated with the vehicle environment may include vehicle data concerning the proximate vehicle and its occupants. The computer processor may receive vehicle data such as the year, make, model, vehicle identification number (VIN) of the proximate vehicle, and/or any associated user information linked with the vehicle data. As one example, the vehicle data received from the proximate vehicle may be associated with an insurance policy covering the proximate vehicle. The vehicle may access this insurance policy and extract other information from the policy that may be relevant. The policy may indicate, inter alia, covered drivers for the proximate vehicle and basic identifying information for those drivers (e.g., name, age, sex, driving experience, license number, license issuing state, etc.). As discussed further herein, an external processing server may receive and use such information when determining a braking indication for display on the computer processor, and more specifically, the electronic display 104.

The method 400 continues at block 404 by comparing the braking force to a predetermined threshold braking force to determine whether the braking force exceeds the threshold braking force. Generally speaking, and as previously mentioned, a force is applied to a brake pedal located within the interior compartment of the vehicle which causes brake pads to contact brake rotors which are connected to rotating axles of the vehicle in order to slow the rotation of the axles, thus slowing the movement of the vehicle. Thus, the mechanical motion of applying the force to the brake pedal generates the braking force to stop the vehicle during the braking event. Accordingly, for any vehicle (e.g., vehicle 102), there may be a maximum braking force that can be applied to stop the vehicle. Block 404 may be performed by, for example, the electronic device 106.

For example, the maximum braking force may be correlated to the maximum distance the brake pedal may travel within the foot well of the driver's side of the interior compartment of the vehicle. If a driver forces the brake pedal to the bottom of the foot well (e.g., to the floor of the interior compartment of the vehicle), then the maximum braking force may be applied to slow the motion of the vehicle. Alternatively, the brake pedal may have a mechanical stop at a point along the travel path of the brake pedal indicating the maximum braking force. To illustrate, the braking system in a vehicle may be a hydraulic braking system. In a hydraulic braking system, the brake pedal may be directly connected to a master cylinder via a connecting rod. The master cylinder may contain hydraulic braking fluid to facilitate the braking process. When a driver applies force to the brake pedal, the connecting rod may actuate the piston of the master cylinder to compress the hydraulic brake fluid. The compression of the hydraulic brake fluid may create a substantial amount of force within the master cylinder, such that the driver may be unable to force the brake pedal to the floor of the foot well. Once the driver has forced the brake pedal to this point along the pedal's travel path, the driver may be said to have applied the maximum braking force.

Consequently, the maximum braking force may be determined based at least in part upon the maximum distance a current driver is capable of forcing the brake pedal to travel along its travel path. The computer processor may determine the capabilities of the current driver by requesting that the current driver, while stationary, apply as much force to the brake pedal as they can. The computer processor may then measure and record the applied force and designate the measured force as the effective maximum braking force corresponding to the current driver. The computer processor may then use this measurement for future portions of the methods described herein.

Moreover, a manufacturer may incorporate a maximum braking force trigger in the vehicle braking system, such that once a driver forces the brake pedal to a predetermined location along the pedal's travel path, the braking system will automatically apply the maximum braking force. However, it will be appreciated that the maximum braking force may be determined in any suitable manner, and may be continuously updated (e.g., based at least in part upon the current driver of the vehicle) or pre-established based at least in part upon manufacturer specifications. Additionally, it should be understood that the maximum braking force may correspond to the braking force applied by the driver to the brake pedal, or in embodiments, the braking force applied by the brake pads to the brake rotors.

In any event, a computer processor (e.g., electronic device 106) may determine the threshold braking force based at least in part upon the maximum braking force. For example, the computer processor may be pre-programmed by a vehicle manufacturer to use a predetermined threshold braking force corresponding to 70% of the maximum braking force (e.g., the "threshold braking force percentage"). Thus, in embodiments where the maximum braking force is determined based at least in part upon the current driver of the vehicle (e.g., based at least in part upon a maximum force the current driver is capable of applying to the brake pedal), the computer processor may update the threshold braking force by multiplying the known maximum braking force of the current driver by 70%. To illustrate, assume a current driver of a vehicle is capable of applying a maximum braking force of 100 Newtons (N) to a brake pedal of the vehicle. The computer processor may recognize, retrieve, and/or otherwise acknowledge that this 100 N value corresponds to the maximum braking force for the current driver, and apply the 70% factor to determine a 70 N threshold braking force. Consequently, if the current driver applies greater than or equal to 70 N of braking force to the brake pedal at any point during a vehicle trip, the computer processor may display a braking indication that includes a braking rationale. It should be understood that, in embodiments, the braking force may be needed to exceed the threshold braking force, such that if the braking force equals the threshold braking force, the computer processor may not include a braking rationale in the braking indication.

Moreover, in embodiments, both the maximum braking force and the threshold braking force percentage may be pre-determined. For example, an entity (e.g., vehicle manufacturer, insurance provider, etc.) may determine the maximum braking force and the threshold braking force percentage, and program the computer processor to perform certain actions with respect to the methods described herein once the computer processor detects an applied braking force that exceeds the pre-determined threshold braking force. To illustrate, the entity may program the computer processor to perform certain actions with respect to the methods described herein once the computer processor detects an applied braking force that exceeds 100 N. Thus, the computer processor may detect an applied braking force from any driver, and compare the detected braking force to the threshold braking force of 100 N.

However, in embodiments, the computer processor may adjust the threshold braking force based at least in part upon current driving conditions. In certain weather conditions, such as rain and snow, roadway surfaces can suffer from reduced friction due to the presence of liquid water and/or ice on the roadway surfaces. The reduced friction can negatively impact driving conditions by making it more difficult to slow the motion of vehicles traveling on these roadway surfaces. Generally speaking, in such conditions, if a driver applies a large amount of braking force in an attempt to rapidly slow the motion of the vehicle, the tires of the vehicle may lose traction due to the presence of the liquid water or ice on the roadway surface. In this scenario, the vehicle may slide on the roadway surface, the driver may lose control of the vehicle, and the vehicle may eventually cause or otherwise be involved in a traffic accident. To avoid these scenarios, drivers often reduce their speeds during such inclement weather conditions, and correspondingly reduce their braking forces.

To accommodate such changes in driving behavior, the computer processor may adjust the threshold braking force. The computer processor may retrieve a set of current or future weather conditions (also referenced herein as "weather information") associated with a current or planned future location of the vehicle. For example, if the driver is following a pre-planned route through a mapping application, the computer processor may retrieve a set of weather conditions corresponding to each of the regions associated with the pre-planned route. In any event, the computer processor may retrieve the weather information from an external database or server (e.g., external processing sever 108, traffic server 110). The computer processor may then adjust the threshold braking force based at least in part upon the retrieved weather information. For example, if the computer processor retrieves weather information corresponding to an upcoming environment of the vehicle based at least in part upon a pre-planned route, the computer processor may adjust the threshold braking force for the upcoming environment once the vehicle reaches the upcoming environment. Moreover, the computer processor may acquire data associated with the environment of the vehicle (e.g., via optional imaging apparatus 208) to verify that the weather conditions are occurring such that the threshold braking force should be adjusted.

To illustrate, assume the computer processor retrieves weather information corresponding to the current and upcoming environments of a vehicle. Further, assume the weather information indicates that a first upcoming environment of the vehicle features rain. The computer processor may utilize this weather information to reduce the threshold braking force associated with the first upcoming environment. Thus, if the normal threshold braking force is 100 N, the computer processor may reduce the threshold braking force associated with the first upcoming environment to 50N to account for the modified driving behaviors typically associated with rainy driving conditions. After the vehicle has exited the first upcoming environment and entered a second upcoming environment, the computer processor may adjust the threshold braking force back to 100 N if the computer processor determines that there is no other reason to adjust the threshold braking force associated with the second upcoming environment.

The method 400 continues at block 406 by displaying a braking indication on an electronic display (e.g., electronic display 104) disposed on a surface of a vehicle (e.g., vehicle 102). The braking indication may have an intensity that is proportional to the braking force. For example, as the driver applies an increasing amount of braking force in an attempt to more quickly slow the motion of the vehicle, a computer processor may correspondingly cause the display to display the braking indication at an increasing intensity. Thus, the increasing intensity of the braking indication may reflect the increasing amount of braking force applied by the driver. The occupants of any proximate vehicles within viewing distance of the vehicle may view the braking indication and then understand the degree of braking applied by the driver of the vehicle. Block 406 may be performed by, for example, the electronic display 104.

Accordingly, if the occupants of the proximate vehicles view the display and interpret the braking indication as having a high-intensity output (e.g., a bright display), the occupants of the proximate vehicles may determine that the driver of the vehicle is braking with a large amount of force. The occupants of the proximate vehicles may then also brake with a large amount of force to ensure they do not accidentally strike the vehicle. In this manner, the systems and methods of the present disclosure may prevent traffic accidents by allowing proximate drivers to fully understand the amount of braking force applied by other drivers, such that the proximate drivers may operate their vehicles accordingly.

Further, the braking indication may include a braking rationale corresponding to the braking event. A computer processor may determine, generate, retrieve, receive, and/or otherwise acquire the braking rationale in response to determining the braking force exceeds the threshold braking force. For example, and as mentioned previously, the braking rationale may include any combination of alphanumeric characters, symbols, images, video images, audio bytes, and/or any other audio/visual representations or combinations thereof. The braking rationale may include phrases such as "Traffic ahead," "Animal crossing," "Traffic accident," or any other suitable message. The computer processor may determine that the braking force exceeds the threshold braking force, and retrieve a braking rationale corresponding to circumstances such as traffic jams, roadwork, a vehicle accident, police activity, weather-induced traffic, an animal crossing, and/or any other traffic circumstance or combination thereof.

Generally speaking, the computer processor may determine the braking rationale using a variety of internal and/or external resources. For example, the computer processor may determine the braking rationale based at least in part upon a stored selection of braking rationales (e.g., stored in database 210 and/or message database 218), the computer processor may internally determine the braking rationale based at least in part upon a braking model stored in memory (e.g., memory 204), the computer processor may request and receive a braking rationale from an external source (e.g., external processing server 108, traffic server 110, and/or external databases 112), or the computer processor may retrieve a braking rationale from an external source (e.g., external processing server 108, traffic server 110, and/or external databases 112).

Moreover, in embodiments, the computer processor may determine, generate, retrieve, receive, and/or otherwise acquire a braking rationale corresponding to an upcoming environment of the vehicle. The upcoming environment may be determined based at least in part upon a pre-planned route (also referenced herein as the "current route") of the vehicle. For example, and as previously mentioned, the vehicle may communicate with other vehicles via V2V communication protocols, with infrastructure components via V2I communication protocols, with external mobile devices, and/or any other suitable external devices to retrieve an upcoming traffic condition corresponding to the current route of the vehicle. Once retrieved, the computer processor may generate a braking rationale based at least in part upon the upcoming traffic condition, and/or request a braking rationale from an external device (e.g., external processing server 108, traffic server 110). Additionally or alternatively, the computer processor may simultaneously retrieve the upcoming traffic condition and a corresponding braking rational from a singular source. The computer processor may generate a braking rationale from the upcoming traffic condition by parsing the upcoming traffic condition to determine a message suitable to quickly convey the information contained therein.

In these embodiments, the vehicle (e.g., vehicle 102) may be a first vehicle, and the computer processor may receive the upcoming traffic condition through, for example, one or more of (i) a second vehicle located in the upcoming environment, (ii) a first infrastructure component located in the upcoming environment, (iii) a third vehicle located in the upcoming environment, and/or (iv) an infrastructure component located in the upcoming environment. As mentioned herein, the vehicle may transmit and/or receive (e.g., via transceiver 206) information from other vehicles or infrastructure components through, for example, V2V or V2I communication protocols. Moreover, as mentioned herein, the computer processor may make a determination related to the braking rationale based at least in part upon a current route/upcoming environment of the vehicle.

Hence, the computer processor may communicate with a second vehicle in the vehicle's upcoming environment to receive the upcoming traffic conditions, such as, current traffic circumstances, delays, weather conditions, etc. The computer processor may also communicate with a first infrastructure component located in the vehicle's upcoming environment to receive such upcoming traffic conditions. It is to be appreciated that the first infrastructure component may be in any suitable location to transmit upcoming traffic conditions to the computer processor. Similarly, the computer processor may communicate with a third vehicle located in the vehicle's upcoming environment or a second infrastructure component in any suitable location to transmit upcoming traffic conditions associated with the vehicle's upcoming environment.

In embodiments, the computer processor may generate a braking rationale by training a braking model. The braking model may be a machine learning model such as a neural network, convolutional neural network, clustering algorithm, regression algorithm, and/or any other suitable machine learning algorithm. The computer processor may train the braking model using (i) a plurality of previous braking forces corresponding to a plurality of previous braking events, and (ii) a set of previous braking rationales. To illustrate, the computer processor may access a database containing previously displayed braking rationales, along with the corresponding braking forces that, once detected by the computer processor, prompted the computer processor to cause the display to display the braking rationales. The computer processor may utilize any suitable parsing algorithm and/or other technique to correlate the displayed braking rationales with the previous braking events. In this manner, the computer processor may build and continually develop a braking model to generate braking rationales once the computer processor detects braking forces that exceed the threshold braking forces.

Further, in these embodiments, the computer processor may apply the braking model to generate the braking rationale. The computer processor may apply the braking model to the braking force applied by the driver, a traffic indication corresponding to the braking event, and/or any other suitable data. In any event, the application of the braking model to the data will result in the computer processor generating a braking rationale that is tailored to the circumstances of the braking event. For example, the computer processor may detect a braking event with a braking force that exceeds the threshold braking force. The computer processor may also retrieve geographical location data of the vehicle and a traffic indication corresponding to the braking event. The computer processor may correlate, via the braking model, the braking force, the geographical location data, and the traffic indication to prior braking rationales generated and displayed based at least in part upon similar data sets. Accordingly, the computer processor may generate, via the braking model, a braking rationale for display that is similar to the prior braking rationales generated and displayed based at least in part upon the similar data sets.

Moreover, the computer processor may determine the braking rationale based at least in part upon a predetermined braking rationale for display in response to the braking event. For example, the braking model may analyze the braking event to determine the braking force applied during the braking event, and may further acquire location data and/or any other suitable data. IN any event, the braking model may use the acquired data as tags to match them with a predetermined braking rationale which is associated with the same tags. For example, the braking event may indicate a braking force of 100 N, a location of a frequently traveled interstate highway, and a time of day of 5:00 PM on a Wednesday. The computer processor may apply the braking model to analyze the data, extract the data as a set of tags (e.g., braking force=100 N, location=interstate X, and date/time=W/5:00 PM), and compare these tags to the tags of each predetermined braking rationale stored in memory (e.g., memory 204). The braking model may not find an exact match, so the computer processor may additionally be configured to display the predetermined braking rationale that bares the closest relation to the tags associated with the braking event. Additionally or alternatively, the braking model may actively determine braking rationales for display based at least in part upon a weighted prioritization.

To illustrate, the braking model may incorporate a weighted prioritization metric to more accurately determine relevant, succinct braking rationales. The weighted prioritization metric may assign weighting values to the data, and determine an associated braking rationale based at least in part upon the most heavily weighted data. Additionally or alternatively, the weighted prioritization metric included in the model may categorize various associations of data, and subsequently apply weighting values based at least in part upon the categorizations. For example, the categorizations may include vehicle telematics data, vehicle routing data, upcoming traffic condition, current traffic condition, and/or any other suitable data or combination thereof. Further, the weighted prioritization metric may assign aggregate weighting values to the categorizations based at least in part upon the type, amount, or other relevant consideration or combination thereof when assigning the aggregate weighting value to the categorization. As an example, the weighted prioritization metric may assign a weighted value of 95 (on a scale of 0-100) to data indicating a vehicle accident directly in front of the vehicle, and a weighted value of 15 if there is traffic data indicating a minor traffic slowdown several miles ahead. Thus, the system may display a braking rationale corresponding to the proximate vehicle accident, instead of a rationale directed to the minor traffic slowdown. Additionally or alternatively, the system may first display the message corresponding to the proximate vehicle accident before transitioning to the message directed to the minor traffic slowdown, reflecting the weighted prioritization. However, it should be understood that the system may display any determined braking rationale in any order, regardless of the prioritization, and such display settings may be adjustable by the user In embodiments, and as previously mentioned, the computer processor may detect proximate vehicles. The computer processor may further determine whether a respective proximate vehicle of the proximate vehicles is within a viewing range of the electronic display before causing the display to display the braking rationale as part of the braking indication. Practically speaking, the braking rationale displayed by the various systems and methods disclosed herein should be displayed for vehicles, and their associated occupants, who are within a reasonable viewing distance from the electronic display. Thus, the system may determine which vehicles, as detected by the electronic device, are within such a reasonable viewing distance prior to determining the braking rationale for display.

For example, assume there are four vehicles behind the vehicle 102, referenced in this example as vehicles 1-4. Further assume vehicles 1-4 are located behind the vehicle 102 by 10, 20, 40, and 100 feet, respectively. The computer processor may determine that vehicles 3 (40 feet behind the vehicle) and 4 (100 feet behind the vehicle) are outside of a reasonable viewing distance from the vehicle. The computer processor may make this determination based at least in part upon a predetermined threshold (e.g., the ECU or other computer processor may determine that any vehicle located more than 30 feet behind the vehicle is outside the reasonable viewing distance), and/or may use additional considerations. For example, the computer processor may reduce the reasonable viewing distance if the data associated with the vehicle 102 environment indicates heavy rainfall, fog, snowfall, or any other relevant consideration or combination thereof.

By contrast, the computer processor may determine that vehicles 1 and 2 are inside the reasonable viewing distance. Accordingly, the computer processor may determine, generate, retrieve, receive, and/or otherwise acquire a braking rationale for display, such that the occupants of vehicles 1 and 2 may view the display and receive the braking rationale contained therein. It is to be understood that the reasonable viewing distance may be any suitable range, and may extend in any suitable direction from the vehicle 102. For example, the computer processor may determine that a proximate vehicle is within 20 feet from the vehicle 102, and is displaced 15 feet directly to the right of the passenger side of the vehicle 102. Thus, the computer processor may determine, generate, retrieve, receive, and/or otherwise acquire a braking rationale for display in response to a braking event, despite the fact that the proximate vehicle may not be in an optimal position to view the display at the time of the braking event.

Moreover, as previously described and in embodiments, the computer processor may generate the braking rationale based at least in part upon a proximate object identified within the environment of the vehicle. More specifically, the computer processor may utilize the set of distances obtained by the proximity sensor (e.g., as a part of the optional imaging apparatus 208) to determine, generate, retrieve, receive, and/or otherwise acquire a braking rationale for display in response to a braking event. For example, the computer processor may utilize the set of distances to generate a braking rationale that includes a distance to the proximate object. The braking rationale may include statements such as "Animal 15 feet ahead," or "Deer in 10 feet," and/or any other suitable braking indication to convey to an occupant of a proximate vehicle that the braking event they observed was due to an animal in front of the vehicle.

In embodiments, the data associated with the vehicle environment further includes one or more of (i) telematics data corresponding to one or more of the proximate vehicles, and/or (ii) following distance data corresponding to one or more of the proximate vehicles. Thus, the systems and methods of the present disclosure may mitigate the effects of hazardous driving behaviors of proximate vehicles in addition to providing contextually-sensitive braking indications to the proximate vehicles.

For example, assume the computer processor receives data from a proximate vehicle indicating that the proximate vehicle approached within 2 feet of the vehicle (e.g., vehicle 102) following a braking event. This distance of 2 feet may comprise the following distance data. The computer processor may further determine that any following distance under 5 feet is too close to the vehicle, and will prompt a braking rationale intended to increase the proximate vehicle's following distance. The braking rationale may include a display such as "Slow Down," "Too Close," or any other suitable indication. Moreover, the braking rationale may indicate that the proximate vehicle is following the vehicle by 2 feet. The braking rationale may include multiple messages, and may scroll across the surface of the electronic display 104, or simply alternate between/among different braking rationales. It should be understood that the following distance data may include more data, such as a following duration. The following duration may include a length of time the proximate vehicle followed the vehicle too closely following the braking event.

In another example, the computer processor may receive data from a proximate vehicle indicating telematics data of the proximate vehicle in relation to a braking event. The telematics data may include, for example, a speed, acceleration, braking event, cornering event, and/or any other suitable telematics indicator for the proximate vehicle. For example, assume that the computer processor receives a speed associated with the proximate vehicle immediately prior to a braking event. Further, assume that the received speed of the proximate vehicle is 80 miles per hour (mph). The computer processor may access external data sources (e.g., external databases 112) and/or utilize image analysis to determine a speed limit associated with the current environment (e.g., current roadway). For example, the computer processor may analyze a set of digital images received from the optional imaging apparatus 208 to determine an associated speed limit. In any event, the computer processor may compare the determined speed limit to the received speed of the proximate vehicle to determine that the proximate vehicle was traveling above the posted speed limit, and should slow down. Correspondingly, the computer processor may display a braking rationale on the electronic display 104 indicating to the proximate vehicle that the proximate vehicle operator should decrease the speed of the proximate vehicle.

In embodiments, and as mentioned herein, the computer processor may transmit the data associated with the vehicle environment to an external processing server in order to determine the braking rationale. Moreover, the electronic display and the electronic device may be communicatively connected, but physically separate elements. For example, the electronic device may be located in the vehicle interior (e.g., as a connected component of the ECU), while the electronic display is disposed on the vehicle exterior (e.g., the rear bumper). The electronic display may then also function as a standalone electronic apparatus, and as previously mentioned, may include a memory, processor, transceiver, and/or any other suitable elements. Thus, additionally or alternatively, the external processing server may transmit the one or more recommended driving behaviors directly to the electronic display.

As discussed further herein, the electronic display (e.g., electronic display 104) may be disposed anywhere on the surface of the vehicle. For example, the electronic display may be disposed on the rear bumper, front bumper, left and/or right side panels, doors, roof, trunk, engine compartment hood, other suitable locations, and any combination thereof. Additionally, the electronic display may be a surface wrap intended to cover any amount from a portion up to the entire exterior surface of the vehicle.

Moreover, and in embodiments, the computer processor may determine, and the electronic display may display one or more braking rationales. Further the electronic display may display the one or more braking rationales for specified durations. For example, the computer processor may determine that a first braking rationale for display in response to a braking event may only need to be displayed for a brief period until the second braking rationale is displayed. Once the brief period has passed, the computer processor may cause the electronic display to display a second braking rationale. Thus, the electronic display may determine, generate, retrieve, receive, and/or otherwise acquire a plurality of braking rationales for display during a plurality of durations.

For example, the computer processor may determine that several braking indications may be relevant for any particular braking event, and may determine (e.g., through use of a model (e.g., braking model)) a display order corresponding to the relevance of each respective braking rationale. To illustrate, the computer processor may determine that a braking rationale directed to a significant traffic circumstance (e.g., proximate vehicle accident) may take priority of display over a braking rationale directed to a minor traffic circumstance (e.g., upcoming minor traffic jam).

In embodiments, the system may incentivize such braking rationale displays. For example, and responsive to displaying the braking rationale on the electronic display, the computer processor may determine one or more of (i) a benefit or (ii) an incentive associated with a policy of the vehicle in exchange for displaying the braking rationale. For example, the computer processor may determine that a user has satisfactorily displayed the braking rationale (e.g., the braking rationale was displayed for the intended duration), and thus qualifies for a benefit associated with their (or their vehicle's) insurance policy (e.g., lower premium, lower deductible, elevated coverage level, etc.). Correspondingly, the computer processor may transmit a notification to an external processing server indicating the intended benefit. The external processing server may then access the insurance policy and apply the benefit to the insurance policy. In this manner, the systems and methods of the present disclosure facilitate both braking rationale display for those within the electronic device's FOV (e.g., FOV 302), and an improved insurance incentive program whereby users (e.g., customers) have increased satisfaction through lower insurance rates and higher levels of service.

By providing systems and methods that allow display of traffic message to proximate vehicles as described herein, various advantages are achieved. For example, the systems and methods provide and/or are implemented through the use of a device(s) that provide information particularly suited for use with other features of the systems and methods to facilitating contextually-sensitive braking indication display on automobiles. Notably, the systems and methods provide a seamless, real-time solution to detecting a braking event with an associated braking force, comparing the braking force to a predetermined threshold braking force, and displaying a braking indication having an intensity that is proportional to the braking force and that includes a braking indication.

Additionally, the systems and methods described herein provide pragmatic, succinct solutions to problems posed by prior systems and methods. Specifically, the systems and methods of the present disclosure provide relevant messages that have a heightened conveyance potential and are specifically crafted to reduce proximate driver confusion and stress. The displays provide a technical improvement over the general messages on conventional display devices and/or radio broadcasts because they are more relevant and effective due to being dynamically updated and targeted for the proximate viewing audience (e.g., proximate motorists). Additionally, placing the displays on proximate vehicles (e.g., electronic display 104 on vehicle 102) presents a technical solution to the technical problem posed by conventional display devices. Namely, the systems and methods of the present disclosure, reduce the distraction potential for other motorists by keeping their focus nearer to their local surroundings (e.g., active roadways, sidewalks, crosswalks, etc.) instead of the elevated positions of conventional display devices that remove their focus from such surroundings. Moreover, by providing these braking indications, the systems and methods of the present disclosure may reduce instances of road rage among the driving population. Thus, the systems and methods of the present disclosure have the additional effect of mitigating future traffic accidents through the benefits associated with minimal driver confusion and stress. Other advantages will be recognized by one of ordinary skill in the art in light of the teaching and disclosure herein.

As will be apparent from the above description, and as should be appreciated with respect to all examples presented herein, the functions or operations shown in FIG. 4 may be performed in any suitable order, any desired number of times, and/or with any suitable variation to the particular order and/or combination shown so as to achieve a desired result, such as a desired manner of facilitating contextually-sensitive braking information display on automobiles.

IV. Examples of Additional Considerations

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing needs that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the electronic display 104, the electronic device 106, the external processing server 108, the traffic server 110, and/or any other computing devices within the example system (100, 200) in any suitable combination). The routines may be included as part of any of the modules described in relation to FIGS. 1 and/or 2 or as part of a module that is external to the system illustrated by FIGS. 1 and/or 2. For example, the methods or portions thereof may be part of a browser application(s) or an application(s) running on any of the devices in the example system (100, 200) as a plug-in or other module of the browser application. Further, the methods may be employed as "software-as-a-service" to provide, for example, the electronic display 104, the electronic device 106, the external processing server 108, the traffic server 110, and/or any other computing devices with access to the example system (100, 200).

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic region (e.g., within a home environment, an office environment, or a server farm). In other example embodiments, the one or more processors or processor-implemented modules may be distributed across a number of geographic regions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for displaying contextually-sensitive braking information on a surface of a vehicle, the system comprising:
   a transceiver;
   one or more memories;
   an electronic display disposed on the surface; and
   one or more processors interfacing with the transceiver, the one or more memories, and the electronic display, and configured to:
      detect a braking event of the vehicle, the braking event associated with a braking force;
      compare the braking force to a predetermined threshold braking force to determine that the braking force exceeds the predetermined threshold braking force;
      in response to determining that the braking force exceeds the predetermined threshold braking force, cause the electronic display to display a braking indication having an intensity that is proportional to the braking force, wherein the braking indication includes a braking rationale corresponding to the braking event wherein the one or more processors are further configured to:
      train a braking model using (i) a plurality of previous braking forces corresponding to a plurality of previous braking events, and (ii) a set of previous braking rationales; and
      apply the braking model to generate the braking rationale.

2. The system of claim 1, wherein the one or more processors are further configured to:
   determine a current route of the vehicle;
   retrieve an upcoming traffic indication from a traffic database based at least in part upon the current route; and
   generate the braking rationale based at least in part upon the upcoming traffic indication.

3. The system of claim 2, wherein the one or more processors are configured to retrieve the upcoming traffic indication from the traffic database by one or more of (i) vehicle-to-vehicle (V2V) communication protocols, (ii) vehicle-to-infrastructure (V2I) communication protocols, or (iii) one or more mobile devices.

4. The system of claim 1, wherein the one or more processors are further configured to:
   capture a set of digital images corresponding to an upcoming environment of the vehicle;
   determine a proximate object within the upcoming environment of the vehicle based at least in part upon the set of digital images; and
   generate the braking rationale based at least in part upon the proximate object.

5. The system of claim 4, wherein to determine the proximate object within the upcoming environment of the vehicle includes using one or more of (i) object recognition (OR), (ii) object character recognition (OCR), or (iii) facial recognition, and wherein the one or more processors are further configured to:
capture a set of proximity data indicative of a set of distances from the vehicle to the proximate object; and
cause the electronic display to display the braking indication, wherein the braking indication includes a distance from the set of distances.

6. The system of claim 1, wherein the one or more processors are further configured to:
retrieve a set of weather conditions associated with a current location of the vehicle; and
adjust the threshold braking force based at least in part upon the set of weather conditions.

7. A computer-implemented method for displaying contextually-sensitive braking information on a surface of a vehicle, the method comprising:
detecting, by one or more processors, a braking event of the vehicle, the braking event associated with a braking force;
comparing, by the one or more processors, the braking force to a predetermined threshold braking force to determine whether the braking force exceeds the predetermined threshold braking force;
in response to determining that the braking force exceeds the predetermined threshold braking force, displaying, by an electronic display disposed on the surface, a braking indication having an intensity that is proportional to the braking force;
training, by the one or more processors, a braking model using (i) a plurality of previous braking forces corresponding to a plurality of previous braking events, and (ii) a set of previous braking rationales; and
applying, by the one or more processors, the braking model to generate a braking rationale corresponding to the braking event;
wherein the braking indication includes the braking rationale corresponding to the braking event.

8. The computer-implemented method of claim 7, further comprising:
determining, by the one or more processors, a current route of the vehicle;
retrieving, by the one or more processors, an upcoming traffic indication from a traffic database based at least in part upon the current route; and
generating, by the one or more processors, the braking rationale based at least in part upon the upcoming traffic indication.

9. The computer-implemented method of claim 8, wherein retrieving the upcoming traffic indication from the traffic database further includes utilizing one or more of (i) vehicle-to-vehicle (V2V) communication protocols, (ii) vehicle-to-infrastructure (V2I) communication protocols, or (iii) one or more mobile devices.

10. The computer-implemented method of claim 7, further comprising:
capturing, by an image sensor, a set of digital images corresponding to an upcoming environment of the vehicle;
determining, by the one or more processors, a proximate object within the upcoming environment of the vehicle based at least in part upon the set of digital images; and
generating, by the one or more processors, the braking rationale based at least in part upon the proximate object.

11. The computer-implemented method of claim 10, wherein determining the proximate object within the upcoming environment of the vehicle includes using one or more of (i) object recognition (OR), (ii) object character recognition (OCR), or (iii) facial recognition, and the method further comprising:
capturing, by a proximity sensor, a set of proximity data indicative of a set of distances from the vehicle to the proximate object; and
displaying, by the electronic display, the braking indication, wherein the braking indication includes a distance from the set of distances.

12. The computer-implemented method of claim 7, further comprising:
retrieving, by the one or more processors, a set of weather conditions associated with a current location of the vehicle; and
adjusting, by the one or more processors, the threshold braking force based at least in part upon the set of weather conditions.

13. A computer readable storage medium comprising non-transitory computer readable instructions stored thereon for displaying contextually-sensitive braking information on a surface of a vehicle, wherein the instructions when executed on one or more processors cause the one or more processors to:
detect a braking event of the vehicle, the braking event associated with a braking force;
compare the braking force to a predetermined threshold braking force to determine whether the braking force exceeds the predetermined threshold braking force;
in response to determining that the braking force exceeds the predetermined threshold braking force, cause the electronic display to display a braking indication having an intensity that is proportional to the braking force;
train a braking model using (i) a plurality of previous braking forces corresponding to a plurality of previous braking events, and (ii) a set of previous braking rationales; and
apply the braking model to generate a braking rationale corresponding to the braking event;
wherein the braking indication includes the braking rationale corresponding to the braking event.

14. The computer readable storage medium of claim 13, wherein the instructions further cause the one or more processors to:
determine a current route of the vehicle;
retrieve an upcoming traffic indication from a traffic database based at least in part upon the current route; and
generate the braking rationale based at least in part upon the upcoming traffic indication.

15. The computer readable storage medium of claim 14, wherein the instructions further cause the one or more processors to retrieve the upcoming traffic indication from the traffic database by one or more of (i) vehicle-to-vehicle (V2V) communication protocols, (ii) vehicle-to-infrastructure (V2I) communication protocols, or (iii) one or more mobile devices.

16. The computer readable storage medium of claim 13, wherein the instructions further cause the one or more processors to:
capture a set of digital images corresponding to an upcoming environment of the vehicle;

determine a proximate object within the upcoming environment of the vehicle based at least in part upon the set of digital images; and generate the braking rationale based at least in part upon the proximate object.

17. The computer readable storage medium of claim 16, wherein determining the proximate object within the upcoming environment of the vehicle includes using one or more of (i) object recognition (OR), (ii) object character recognition (OCR), or (iii) facial recognition, and wherein the instructions further cause the one or more processors to:

capture a set of proximity data indicative of a set of distances from the vehicle to the proximate object; and cause the electronic display to display the braking indication, wherein the braking indication includes a distance from the set of distances.

* * * * *